D. C. STOVER.
BARBED FENCE WIRE.

No. 190,167.  Patented May 1, 1877.

Witnesses:  Inventor:
Daniel C. Stover.
By West & Bond
Attys.

UNITED STATES PATENT OFFICE.

DANIEL C. STOVER, OF FREEPORT, ILLINOIS.

IMPROVEMENT IN BARBED FENCE-WIRES.

Specification forming part of Letters Patent No. 190,167, dated May 1, 1877; application filed January 8, 1877.

*To all whom it may concern:*

Be it known that I, DANIEL C. STOVER, of Freeport, Stephenson county, State of Illinois, have invented a new and useful Improvement in Barbed Fence-Wire, of which the following is a full description, reference being had to the accompanying drawings, in which—

Figure 1:
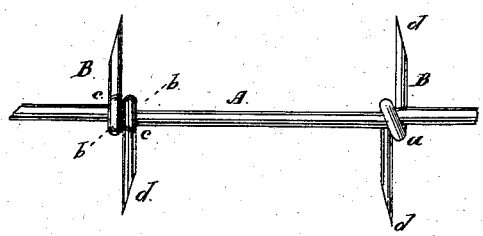
Figure 2:
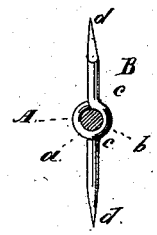

Figure 1 is an elevation or plan; Fig. 2, a side elevation, showing the main wire in section.

My invention is an improvement on that kind of barbed fence-wire which consists of a main wire and a barb, made by wrapping a short piece of pointed wire around the main wire.

Heretofore such wire-barb has been wrapped around the main wire at least twice, which it has been supposed must be done in order to hold the barb securely on the main wire, and keep it in an upright position. When the barb is so applied the main wire rapidly rusts in consequence of the accumulation of moisture about the barb.

This has become a serious objection to this kind of barbed-wire fence, since the rapid rusting of the main wire weakens it so as to materially affect its durability.

To partly overcome this difficulty, and gain some other advantages, is the object of this invention, which I accomplish by wrapping the wire which forms the barb once and one-half times around the main wire, and then bending each prong of the barb so that the two prongs will stand out from the main wire in opposite directions.

In the drawings, A represents the main wire. B represents a barb made of wire. $a$ is a single turn or wrap of the wire, which forms the barb around A. $b\ b$ are quarter-turns of the wire forming the barb around A. $c\ c$ are shoulders or angles formed by bending the prongs $d\ d$ back after the quarter-turns have been made.

The construction described has many advantages, among which are the following: The main wire will not rust as rapidly as when the barb is coiled in the usual manner, and hence will be more durable. The projecting portion of the barb is stiffer than when wrapped in the usual manner, without the angle or shoulder $c$. There is also a saving of material. The portions $b\ b$ of the barb are pressed firmly against the wire A.

I do not claim, broadly, a fence-wire provided with a barb made of wire wrapped around the same; but What I do claim, and desire to secure by Letters Patent, is as follows:

The barb B, having the single turn or wrap $a$ around the main wire, and the locking quarter-turns $b$ and shoulders $c$, in combination with the main wire A, substantially as and for the purposes specified.

DANIEL C. STOVER.

Witnesses:
O. W. BOND,
H. F. BRUNS.